United States Patent
Chrisman et al.

(10) Patent No.: US 9,950,934 B1
(45) Date of Patent: Apr. 24, 2018

(54) APPARATUSES AND METHODS FOR DEGASSING EFFLUENT

(71) Applicant: Grain Processing Corporation, Muscatine, IA (US)

(72) Inventors: Billy D. Chrisman, Muscatine, IA (US); Zac Halloran, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 0 days.

(21) Appl. No.: 14/861,076

(22) Filed: Sep. 22, 2015

(51) Int. Cl.
*B01D 19/00* (2006.01)
*C02F 1/20* (2006.01)
*C02F 1/00* (2006.01)

(52) U.S. Cl.
CPC ............ *C02F 1/20* (2013.01); *B01D 19/0042* (2013.01); *C02F 2001/007* (2013.01)

(58) Field of Classification Search
CPC .. C02F 1/20; C02F 2001/007; B01D 21/0042; B01D 21/0045; B01D 19/00–19/0495
USPC .................................................. 95/241–266
See application file for complete search history.

(56) References Cited

U.S. PATENT DOCUMENTS

| | | | | |
|---|---|---|---|---|
| 1,806,090 A | * | 5/1931 | Seguy | B01D 3/14 202/158 |
| 3,446,489 A | * | 5/1969 | Leva | B01D 3/008 261/113 |
| 4,062,662 A | | 12/1977 | Kuxdorf et al. | |
| 6,663,777 B2 | | 12/2003 | Schimel | |
| 8,708,065 B2 | | 4/2014 | Largent | |

OTHER PUBLICATIONS

Dachuan Machinery, "Mud Gas Separator," taken from http://www.dcmudcleaningequipment.com/product/mud-gas-separator.html Oct. 1, 2015 (3 pages) (date unknown).
Mathena, "Mud-Gas Separator," taken from http://www.mathena-inc.com/mud-gas-separator (1 page) (date unknown).
Burke, Dennis A., Dairy Waste Anaerobic Digestion Handbook, "Options for Recovering Beneficial Products From Dairy Manure," Jun. 2001 (57 pages).
Levlin, "Maximizing sludge and biogas production for counteracting global warming," 2014 (10 pages).
Mathena Inc. Product Guide 2013 (16 pages).

* cited by examiner

*Primary Examiner* — T. Bennett McKenzie
(74) *Attorney, Agent, or Firm* — Fitch, Even, Tabin & Flannery LLP (57) ABSTRACT

Disclosed is a multi-stage degassing unit for degassing waste water, such as effluent from grain milling processes, through impingement upon successive impact plates. The degassing unit has one or more stages of impact plates, which alternate with redistribution trays that receive the waste water that impinges upon the impact plates directly above the trays and then redistributes the waste water through a plurality of apertures in the redistribution tray. The process of impinging the waste water against the impact plates, collecting the water, and redistributing the water into a plurality of streams may be repeated as necessary to sufficiently remove gas clinging to biomass in the waste water. This degassing will promote the settlement of the biomass for reuse in the water treatment process to reduce biological oxygen demand.

10 Claims, 6 Drawing Sheets

APPARATUSES AND METHODS FOR DEGASSING EFFLUENT

TECHNICAL FIELD

This invention relates generally to removing gases from waste water, and particularly apparatuses and methods for separating gases from suspended solids.

BACKGROUND

In the processing of grains, such as the wet milling of corn, waste water or effluent containing organic biomass is produced. The waste water will have a certain biological oxygen demand (BOD), which may vary depending on the type of processing occurring at the facility. If the BOD is high enough, it must be reduced to acceptable levels before the waste water is reintroduced to the environment. Typically, the waste water will be introduced into an anaerobic digester to help break down the organic material in the waste water to reduce its BOD. During the anaerobic digestion process, microorganisms such as bacteria in the waste water break up the organic material and gases, such as carbon dioxide, methane, and nitrogen are released. It is desirable to remove these gases from the waste water for a number of reasons. For example, methane produced can be captured and used in other industrial processes as an energy source.

Because the treatment process is continuous, microorganisms needed for the digestion process frequently need to be replenished. However, the gases created during anaerobic digestion can adversely affect the water treatment process by hindering the recapture of these microorganisms. In particular, the gases released during anaerobic digestion can tend to cling to the microorganisms, causing them to float. This is problematic, because in order to isolate and recapture the microorganisms, they must be allowed to settle in a settling tank to prevent them from being sent to further treatment and eventually being disposed of when the fully treated water is released. A polymer, such as a cationic polyacrylamide polymer, may be added to the waste water prior to entering the settlement tank to help flocculate the remaining biomass, which promotes sedimentation of the solids. However, if insufficient microorganisms are recovered from the digestion process, the capacity of the anaerobic digester will be reduced, thereby reducing upstream production capacity.

In order to remove gas from the waste water after the anaerobic digestion process, the waste water is introduced into a degassing tank. Prior known methods for degassing waste water, such as by an agitator, may not sufficiently remove gas from the waste water, particularly when the flow rate of waste water or the BOD load is relatively high. Further, space limitations can rule out other known methods of degassing. Thus, improvement in the degassing of waste water is desirable.

SUMMARY

Generally speaking, pursuant to these various embodiments, an improved degassing apparatus and method of degassing wastewater is disclosed. The degassing apparatus generally includes a series of impact plates arranged in vertical succession. Gravitational fluid flow will cause impingement of the liquid against the impact plates in plural steps. Via this impingement, the liquid experiences abrupt changes in momentum, which dislodges gas that is clinging to biomass in the liquid. The impact plates are interspersed between one or more redistribution trays, which receive waste water that splashes off of the impact plates positioned above the trays and then redistributes the waste water through apertures in the plates into a plurality of streams. Preferably, to increase the exposure of the waste water to the surrounding air, the waste water is redistributed into many individual streams which each then impact against individual impact plates. The use of individual impact plates for each stream prevents waste water from pooling on top of the impact plates, which acts as a cushion and reduces the force of the impact of the waste water impinging against the impact plate. Preferably, the impact plates are positioned so as to avoid pooling or submersion of plates in water collected in the redistribution trays. The process of impinging the liquid against the impact plates, and collecting and redistributing the liquid may be repeated as many times as desired or as space permits. Advantageously a degassing unit according to the disclosed embodiments may be introduced into an existing tank or vessel and suspended above the liquid level of the tank, relying on gravity to pull the liquid through the degassing unit. Accordingly, the present invention can be implemented with minimal modifications to existing water treatment installations.

Additional features of the preferred embodiments will be evident from the above and from the description and drawings.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments.

DESCRIPTION

A degassing unit in accordance with the present invention may take a variety of different forms. In one form, the apparatus includes a first impact plate and a first redistribution tray below the first impact plate to receive effluent passing from the first impact plate. The first redistribution tray includes a plurality of apertures therein to allow the effluent to pass therethrough. A plurality of second impact plates are arranged below and spaced from the plurality of apertures of the first redistribution tray such that effluent passing from the plurality of apertures will impinge upon the plurality of second impact plates below the apertures. The unit may include a second redistribution tray below the plurality of second impact plates to receive effluent passing from the plurality of second impact plates, the second redistribution tray having a plurality of apertures therein to allow the effluent to pass therethrough. Each of the plurality of second impact plates may be arranged such that the top surfaces of each of the second impact plates are in a common plane perpendicular to a longitudinal axis extending between the first impact plate and the first redistribution tray. The apertures in the redistribution trays may be aligned with one another, or may have different arrangements.

The degassing unit may have additional levels of impact plates and redistribution trays. For example, the unit may have a plurality of third impact plates arranged such that each third impact plate is below and spaced from the plurality of apertures of the second redistribution tray such that effluent passing from the plurality of apertures of the second redistribution tray will impinge upon the plurality of third impact plates below the apertures. In some forms, each impact plate may be directly above and spaced from one or more apertures in the redistribution tray immediately below it. Preferably the impact plates are sized such that the entire stream of effluent above the impact plate will impinge upon it. In the case of the first impact plate which may be located directly beneath the entire flow of effluent, the impact plate may be sized to be much larger than the impact plates in subsequent levels or stages, and may be have at least twice the surface area of an individual one of the plurality of second, third, fourth, fifth, or subsequent levels of impact plates.

The redistribution trays and the first impact plate are preferably arranged with their centers aligned along a longitudinal axis. In some forms, the plurality of second impact plates are equal in number to the plurality of apertures in the first redistribution tray with each of the second impact plates having a top surface spaced below a different one of the plurality of apertures in the first redistribution tray. The second redistribution tray is spaced below the plurality of second impact plates and has a center aligned with the center of the first impact plate and a plurality of apertures for allowing the liquid to pass therethrough. The degassing unit may have a plurality of third impact plates equal in number to the plurality of apertures in the second redistribution tray with each of the third impact plates having a top surface spaced below a different one of the plurality of apertures in the second redistribution tray. The first impact plate is attached to the first redistribution tray by a plurality of support legs, and similarly the second impact plates are each attached to the second redistribution tray by support legs. In some forms, the distance between top surface of the first impact plate and the first redistribution tray below the first impact plate is six inches, and the distance between the top surfaces of each of the second impact plates and the second redistribution tray below the second impact plates is three inches. These distances may be varied depending on various design factors, including the amount of liquid hold up in the tray below the impact plate or plates, as discussed in greater detail below.

In one form of a method for degassing effluent in accordance with embodiments of the present invention, introducing the flow of an effluent stream to a degassing apparatus such as described herein, including a first impact plate, a first redistribution tray below the first impact plate to receive effluent passing from the first impact plate, and a plurality of second impact plates arranged such that the second impact plates are below and spaced from the plurality of apertures of the first redistribution tray such that effluent streams passing from the plurality of apertures will impinge upon the plurality of second impact plates below the apertures to thereby dislodge gas therefrom. Additional stages of redistribution trays and impact plates may be arranged below the second impact plates to further remove gas from the effluent stream. After passing through the degassing apparatus, the effluent is collected in a storage vessel. The solids in the effluent may be allowed to settle after the effluent has been collected in the storage vessel. The effluent may be processed in an anaerobic digester prior to introducing the effluent to the first impact plate.

The number and size of the apertures in the redistribution trays may be calculated to allow sufficient build-up of waste water in the tray to ensure that the water is evenly distributed across the surface area of the tray. However, the water level in the tray should not be allowed to flow off the edge of the tray, thereby bypassing impact plates below the tray and reducing the effectiveness of the degassing unit. Accordingly the redistribution trays are provided with an outer wall or rim to allow limited filling of the tray to promote even redistribution of the waste water through each of the apertures in the tray. However, the height of the rim of the redistribution tray preferably should be no higher than the top surface of the impact plate or plates directly above the redistribution tray to keep the impact plate from being submerged.

Various benefits may be attained by implementing embodiments according to the present invention. First, by improving settlement of the microorganisms, the amount of microorganisms that are recaptured for use in the anaerobic digestion process is increased. This causes the capacity and performance of the entire treatment process to be increased (for example, increased flow rates and ability to handle greater BOD), allowing for increased production of pre-waste water treatment processes. In addition, the amount of polymer used to flocculate the microorganisms after the degassing process may be reduced.

Figure 1:
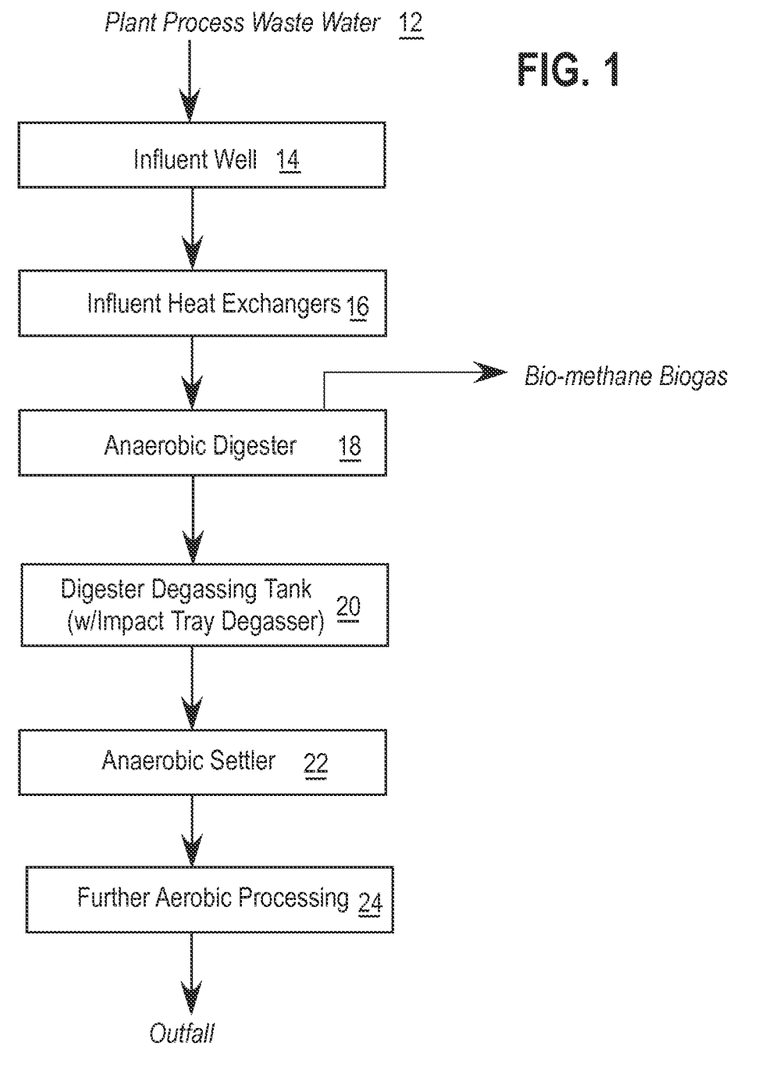
FIG. 1 is a flow chart showing a process for treating waste water, including degassing the waste water with a degassing unit in accordance with various embodiments of the invention.

Generally speaking, pursuant to these various embodiments, a degassing unit 10 for degassing a flow of waste water or effluent 12 is described. The degassing unit 10 in one form may be placed or suspended above a tank 20 for collecting the effluent, typically after the effluent 12 has gone through an anaerobic digestion process. As shown in FIG. 1, a typical process water treatment program may include a number processes, including collection of plant process waste water in an influent well 14, where the influent may be cooled using one or more heat exchangers 16. The waste water 12 may then be transferred to an anaerobic digester 18 to help break down biomass/bio-organisms in the wastewater 12 and thereby reduce its BOD. The digester may be agitated to help break down microorganisms, releasing gases such as carbon dioxide, methane, and nitrogen. Gases can cling to the microorganisms, causing them to float in the waste water 12. Methane gas may be recovered from the digestion process and reused as an energy source.

After the digestion process, the waste water 12 is introduced to a degassing tank 20. After degassing, which will be described in greater detail below, the waste water 12 is introduced into one or more anaerobic settling tanks 22. In the settling tank 22, gravity causes the solids, including microorganisms, to settle to the bottom of the tank. Rakes in the bottom of the tank removes the stratified solids for reuse in the anaerobic digester, while the remaining liquid is introduced into further aerobic processing 24 to further reduce BOD.

Figure 2:
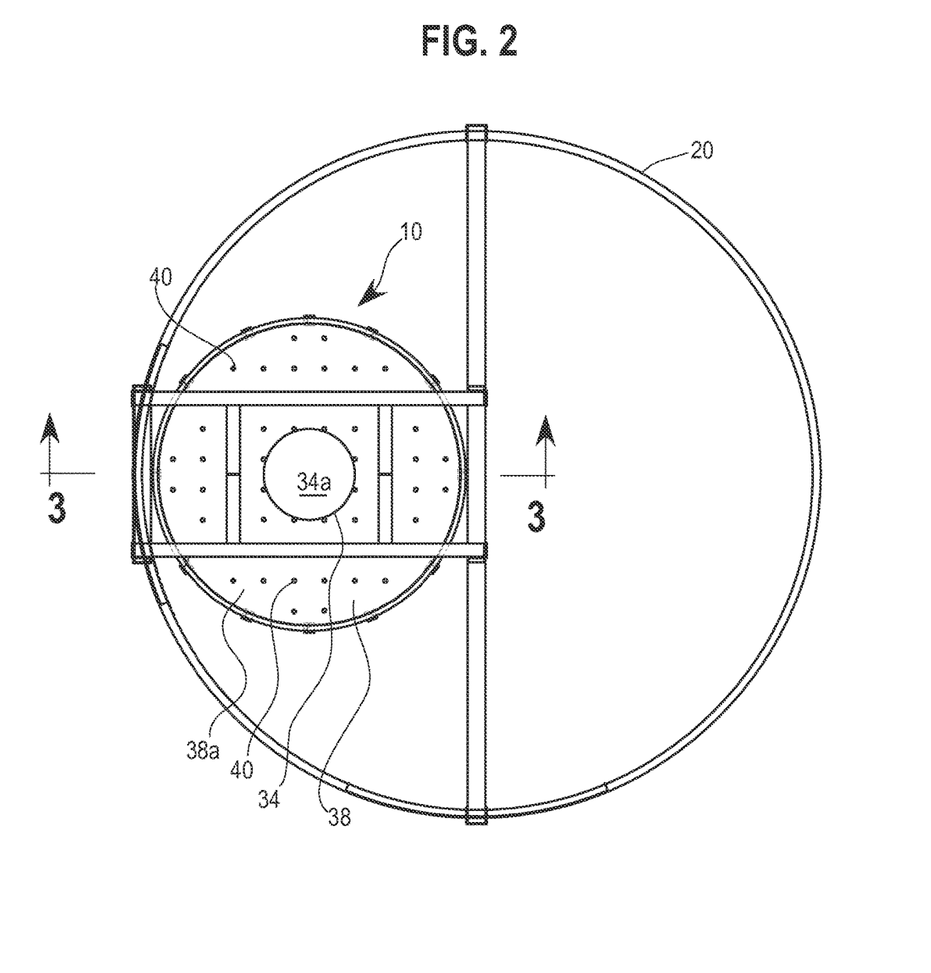
FIG. 2 is a top view of the degassing unit positioned within a vessel in accordance with various embodiments of the invention.
Figure 3:
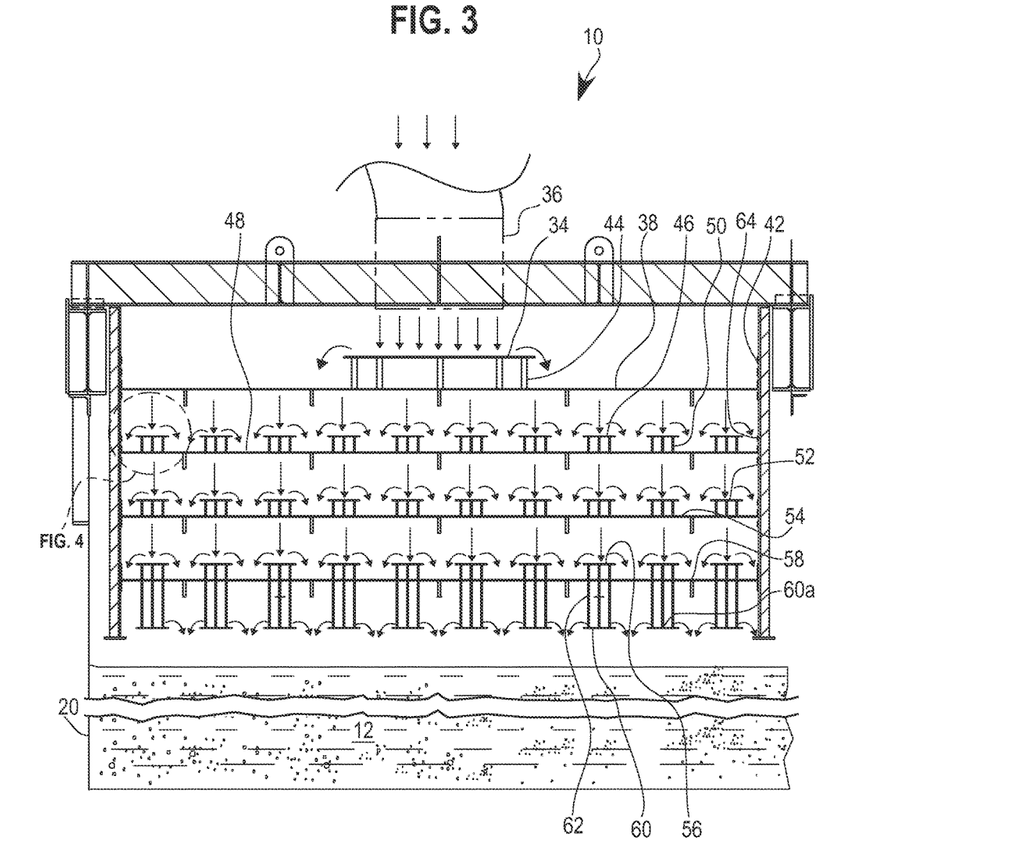
FIG. 3 is a cross-section view of section 3-3 of the degassing unit of FIG. 2.
Figure 4:
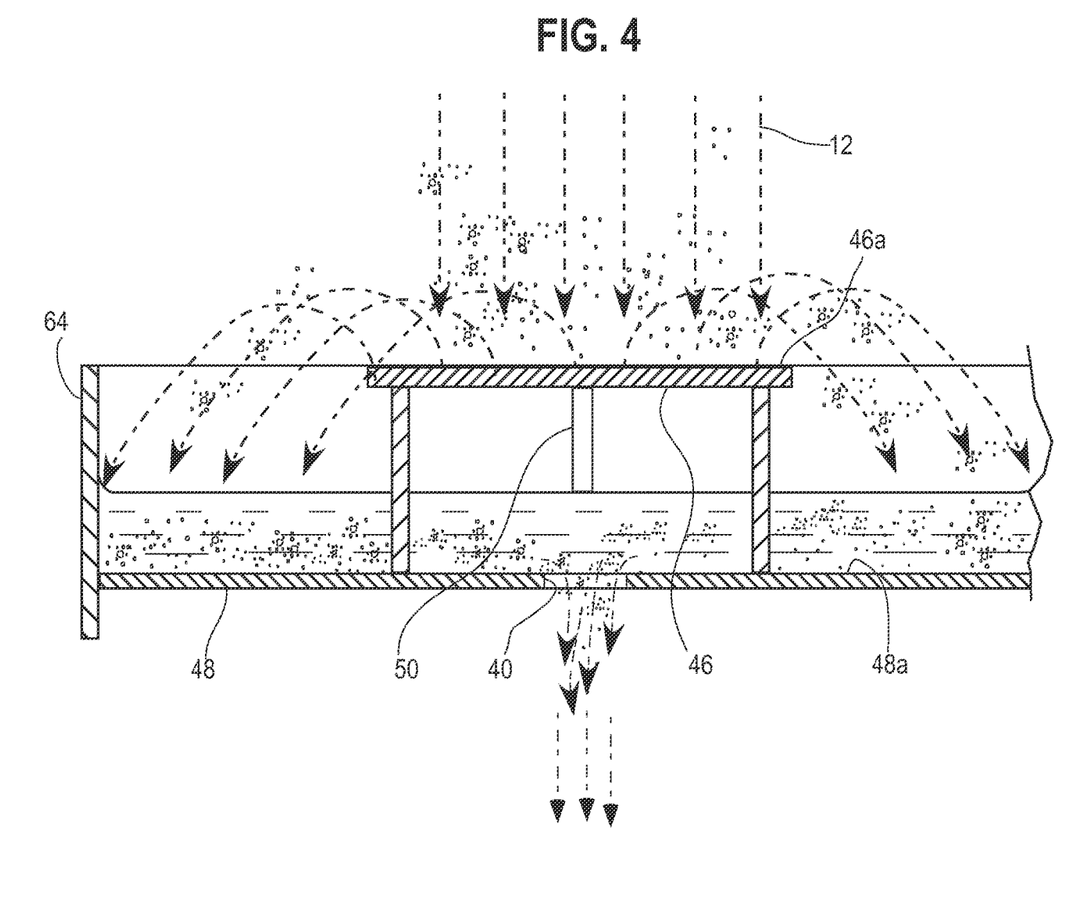
FIG. 4 is an enlarged representation of waste water impinging on an impact plate of the degassing unit of FIG. 2 and collecting and passing through a redistribution tray.

In a preferred form, the degassing unit 10 is suspended over the degassing tank 20 below the inlet 36 from which waste water 12 is introduced. The degassing unit 10 is provided with a series of impact plates 34, 46, 52, 56, and 60 upon which the waste water 12 impinges. The resulting impact and change in momentum causes gases that are attached to microorganisms in the waste water 12 to become dislodged and thereby be released from the waste water stream. In one form shown in FIGS. 2 and 3, a first impact plate 34 is arranged directly below the inlet 36 such that all of the waste water 12 will impinge against the top surface 34a of the first impact plate 34. The first impact plate 34 has a circular shape with a diameter larger than the diameter of the inlet 36 so that the entire waste water stream will impinge upon the first impact plate 34. Waste water 12 impacting against the first impact plate 34 will be scattered in all directions outwardly as shown in FIGS. 3 and 4, and then follows the path illustrated in FIG. 3. The waste water 12 is then received and briefly collected in a first redistribution tray 38, which is located below the first impact plate 34.

The first redistribution tray 38 functions to collect waste water 12 after it impacts the first impact plate 34, and then redistributes the water 12 through a plurality of apertures 40 in the floor 38a of the tray. The first redistribution tray 38 has a circular configuration and includes a rim 42 around the perimeter of the tray to help collect waste water 12 and keep it from flowing off the edge of the tray 38. In addition, allowing the water 12 to collect along the entire surface area of the tray 38 helps to evenly distribute the waste water 12 through each of the plurality of apertures 40. The diameter of the first redistribution tray 38 is substantially larger than the first impact plate 34 to collect all of the waste water 12 splashing off of the plate 34. Further, the larger diameter of the redistribution tray 38 allows the waste water 12 to be redistributed through a relatively large number of apertures 40, which in the depicted form include sixty-eight apertures 40 arranged in a rectilinear grid-like array with each row and column of apertures 40 spaced apart along the grid by the same distance.

In one form, the apertures may be spaced one foot apart and may have a diameter of 1.5 inches. Other arrangements of apertures could be used, such as a radial pattern, or a non-uniform or eccentric pattern as desired. The apertures 40 in the redistribution tray may be sized such that the level of liquid collected in the tray stays within an acceptable range, i.e., sufficiently high to distribute the collected liquid evenly across the tray 38, but not so high as to overflow over the outer rim 42. The liquid level hold up (in feet) in a tray may be calculated using the equation:

$$h_l = \frac{\left(\frac{q}{C_d A}\right)^2}{2g},$$

wherein q is the volumetric flow rate in cubic feet per second, $C_d$ is the discharge coefficient for an orifice, which typically ranges between 0.6 to 1, A is the area of the orifice opening in square feet, g is the acceleration due to gravity (32.2 ft/sec^2), and $h_l$ is head pressure of liquid in feet of liquid.

Turning to FIG. 3, which is a cross sectional representation of the degassing unit 10, showing the flow path of the effluent 12 through the unit 10. The effluent 12 impinges upon the first impact plate 34, which is supported by support legs 44 that extend from the first tray floor 38a. The effluent then flows through the apertures 40 in the first redistribution tray 38 as shown by the downward directed arrows directly below the first redistribution tray. In the depicted embodiment, the effluent is redistributed into 68 separate streams to impact against 68 separate second impact plates 46. The second impact plates 46 are arranged so as to be directly below the apertures 40 in the first redistribution tray and are sized such that the entirety of each stream impinges upon a different impact plate 46. This process of impingement, collection, and redistribution is repeated at each stage of the degassing unit (i.e. 4 times), finishing with a final impingement against a plurality of fifth impact plates 60.

Figure 6:
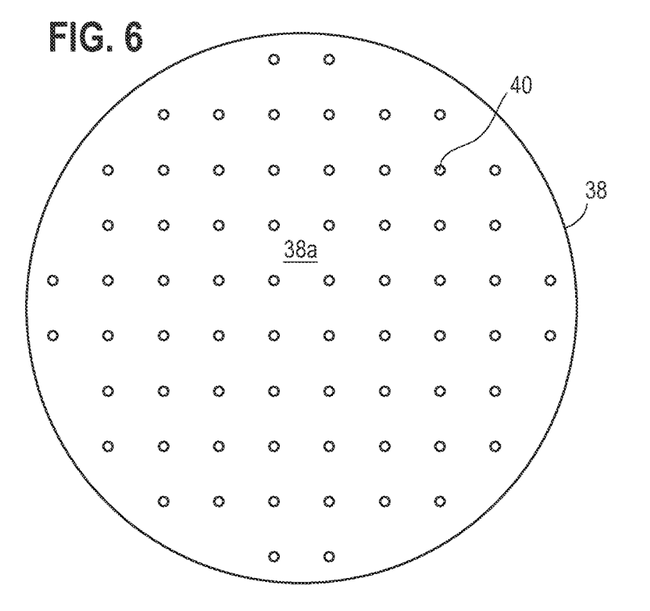
FIG. 6 is a top view of a redistribution tray of the degassing unit of FIG. 2 illustrating the arrangement of the apertures therein.
Figure 7:
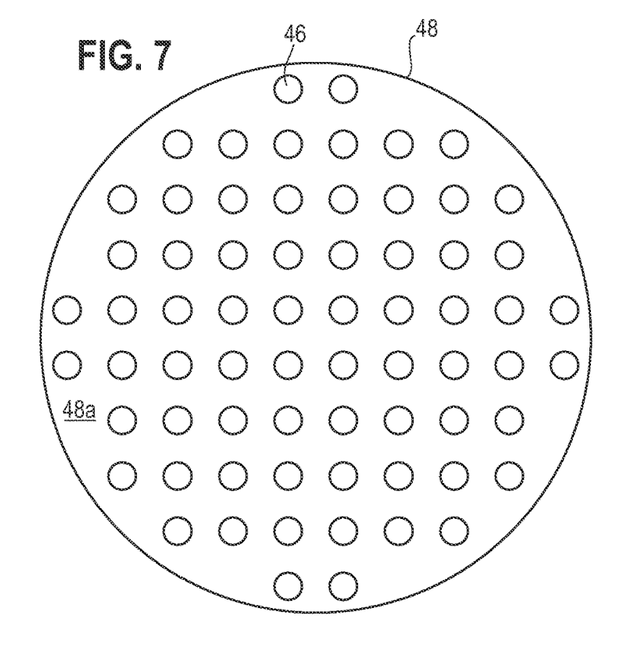
FIG. 7 is a top view of a redistribution tray showing the arrangement of the impact plates above the redistribution tray.

A detail of one of the impact plates 46 is shown in FIG. 4. The second impact plates have a circular configuration with a diameter of six inches, although the size of the impact plate may vary depending upon the desired capacity of the unit 10. Each second impact plate is connected to a second redistribution tray 48 by three support legs 50 that space the impact plate 46 from the second redistribution tray floor 48a. As shown in FIG. 7, the second impact plates 46 are arranged in a rectilinear grid identical to the grid of the apertures in the redistribution tray shown in FIG. 6. The third and fourth impact plates 52, 56 are arranged in the same manner.

As shown in FIG. 4, impact plate 46 is impinged upon by waste water 12, which splashes down off of the top surface 46a thereof and into the redistribution tray 48 below. Impact plate 46 is representative of the other second impact plates 46, as well as the third and fourth arrays of impact plates 52, 56 therebelow. In addition, the third redistribution tray 54 is identical to the second redistribution tray 48. The fourth redistribution tray 58 is identical to the second and third trays 48, 54, except an additional fifth array of impact plates 60 are connected to the bottom of the tray floor 58b. The fifth impact plates 60 are identical to the second, third, and fourth impact plates, except that the support legs 62 that attach them to the fourth redistribution tray floor 58b are longer and are connected to the top surface 60a of the impact plates 60. Accordingly, the waste water 12 impinges upon the top surface 60a of the fifth impact plates 60 before finally falling down into the tank 20. Thereafter, the waste water 12 may introduced to a settling tank 22 where the suspended solids will settle and be collected for being reintroduced to the anaerobic digester 18.

Figure 5:
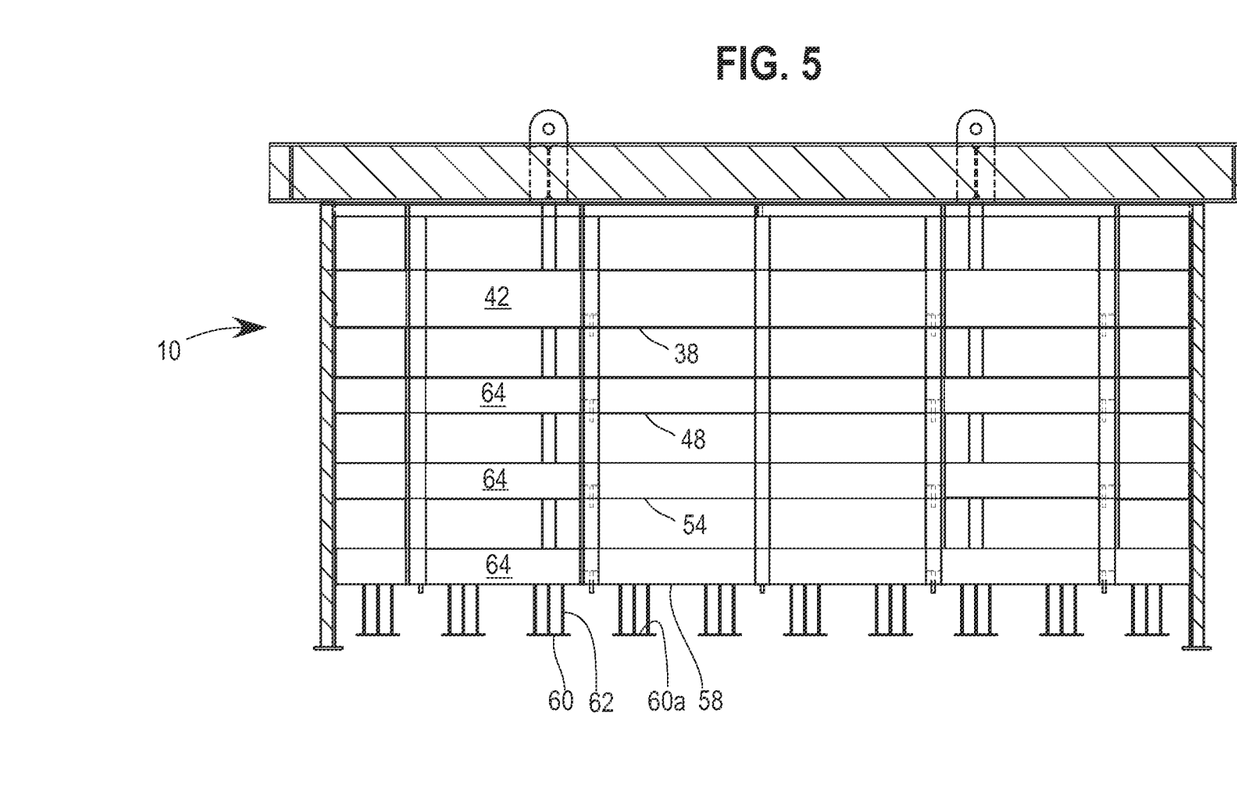
FIG. 5 is a side view of the degassing unit of FIG. 2.

As shown in FIGS. 2 and 5, the degassing unit 10 is provided with support structure for hanging the unit below the effluent inlet 36. The tank 20 can be reinforced to support the degassing unit 10, which may then be suspended advantageously from an existing tank wall. Because the degassing unit 10 has a compact configuration, it may fit below the waste water inlet 36 and above the liquid level of the tank 20. Various support beams and stiffeners are used to support and strengthen the degassing unit 10. The degassing unit 10 and its support structure are preferably constructed of a stainless steel, such as 316 stainless, although other materials may be used.

In the depicted embodiment, the apertures 40 in the redistribution plates are each 1½ inches in diameter and spaced 12 inches apart. Each redistribution tray is spaced approximately a foot apart and has a diameter of ten feet with an outer rim that extends between three and six inches above the surface of the plate. The top redistribution tray 38 has an outer rim 42 that extends six inches above the first redistribution tray 38, while the successive redistribution trays 48, 54, 58 may have outer rims 64 that extend three inches above the surface of each tray. The top impact plate 34 has a diameter of 3 feet and the rest of the successive impact plates 46, 52, 56, 60 have diameters of six inches. Each impact plate is supported by supports or legs 44, 50, 62 which range between 6 inches for the top impact plate 34 and approximately 3 inches for the second, third, and fourth impact plates 46, 52, and 56. The support legs 62 for the fifth impact plates 60 are 12 inches long. Thus, the impact plates 34, 46, 52, and 56 are each positioned at or near the height of the outer rim of the redistribution plate from which the impact plate is connected. Because the trays are spaced a foot apart, and the second, third, and fourth impact plates sit three inches above the redistribution trays, the streams of waste water will fall approximately 9 inches from the redistribution tray above each impact plate. The respective sizes of the impact plates, redistribution trays, tray apertures, and other components may be varied depending on the application, nature and composition of the effluent or other liquid or mixture to be degassed, and the flow rate of such liquid. In addition, the number of stages may be varied depending on application. For example, instead of four redistribution trays and five stages of impact plates, one, two, three, four, or more than five stages of impact plates could be used. In this or other forms, varying numbers of apertures and corresponding impact plates could be used at each stage.

In some forms, the redistribution tray could serve as an impact plate, and the impact plates could be omitted. In such a form, the arrangement of apertures in the redistribution tray could be varied to ensure that the effluent properly impacts the tray before passing through to the next impact plate or redistribution tray. However, it is generally preferred that the effluent strike the surface of a plate or tray rather than the surface of pooled effluent that has collected in the redistribution tray, as this is much more effective in dislodging gas from the effluent. In addition, various sizes of redistribution trays or impact plates may be used, such as a smaller tray succeeded by a larger tray succeeded by an even larger tray. In such a configuration, should the first tray overflow over the rim surrounding the tray, the effluent would land in the next lower redistribution tray and be redistributed.

It is thus seen that a degassing apparatus and method for degassing are provided. In practice, it has been observed that a reduction in the amount of flocculating polymer relative to the absence of the degassing apparatus may be employed. The degassing apparatus is believed to improve the overall separation between liquid and solid and hence to accommodate higher flow rates and higher BOD of influent from plant processes in a corn wet milling plant. While described in connection therewith, the degassing apparatus will be useful in other contexts and for other degassing purposes.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. An apparatus for degassing effluent, comprising:
   a first impact plate;
   a first redistribution tray below the first impact plate to receive effluent passing from the first impact plate, the first redistribution tray including a plurality of apertures therein to allow the effluent to pass therethrough; and
   a plurality of second impact plates arranged such that the second impact plates are below and spaced from the plurality of apertures of the first redistribution tray such that effluent passing from the plurality of apertures will impinge upon the plurality of second impact plates below the apertures, wherein each of the plurality of second impact plates has a generally planar top surface, and wherein at least two of said second impact plates are arranged such that their top surfaces are generally co-planar with respect to one another in a common plane perpendicular to a longitudinal axis extending between the first impact plate and the first redistribution tray,
   said first impact plate being disposed above said first redistribution tray whereby liquid entering said apparatus first impinges on said first impact plate, said first impact plate having at least twice the surface area of an individual one of the plurality of second impact plates.

2. The apparatus of claim 1, further comprising a second redistribution tray below the plurality of second impact plates to receive effluent passing from the plurality of second impact plates, the second redistribution tray including a plurality of apertures therein to allow the effluent to pass therethrough.

3. The apparatus of claim 2, wherein each one of the plurality of apertures of the first redistribution tray are aligned with a different one of the plurality of apertures of the second redistribution tray.

4. The apparatus of claim 1, wherein the first redistribution tray includes a rim surrounding an edge of the tray for retaining effluent and allowing redistribution of effluent through the plurality of apertures in the first redistribution tray.

5. The apparatus of claim 3, wherein the first impact plate comprises a top surface that is even with or above a top edge of the rim of the first redistribution tray.

6. The apparatus of claim 2, further comprising a plurality of third impact plates arranged such that each third impact plate is below and spaced from the plurality of apertures of the second redistribution tray such that effluent passing from the plurality of apertures of the second redistribution tray will impinge upon the plurality of third impact plates below the apertures.

7. The apparatus of claim 2, wherein each one of the plurality of second impact plates are disposed above and are spaced from a different one of the plurality of apertures in the second redistribution tray.

8. The apparatus of claim 1, wherein the impact plates are configured to allow liquid to impinge on the first impact plate at the same time as liquid impinges on said second impact plate.

9. The apparatus of claim 2, the apertures in said second redistribution tray each being disposed directly beneath one of said second impact plates.

10. The apparatus of claim 9, further comprising a plurality of third impact plates arranged such that each third impact plate is below and spaced from the plurality of apertures of the second redistribution tray such that effluent passing from the plurality of apertures of the second redistribution tray will impinge upon the plurality of third impact plates below the apertures.

\* \* \* \* \*